No. 637,091. Patented Nov. 14, 1899.
G. CUTTER.
WEEDING IMPLEMENT.
(Application filed Feb. 20, 1899.)
(No Model.)
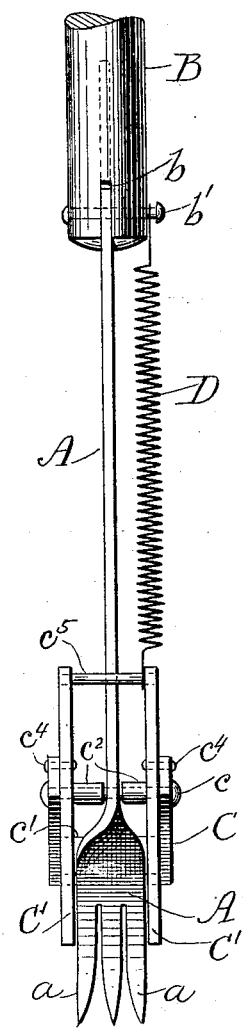
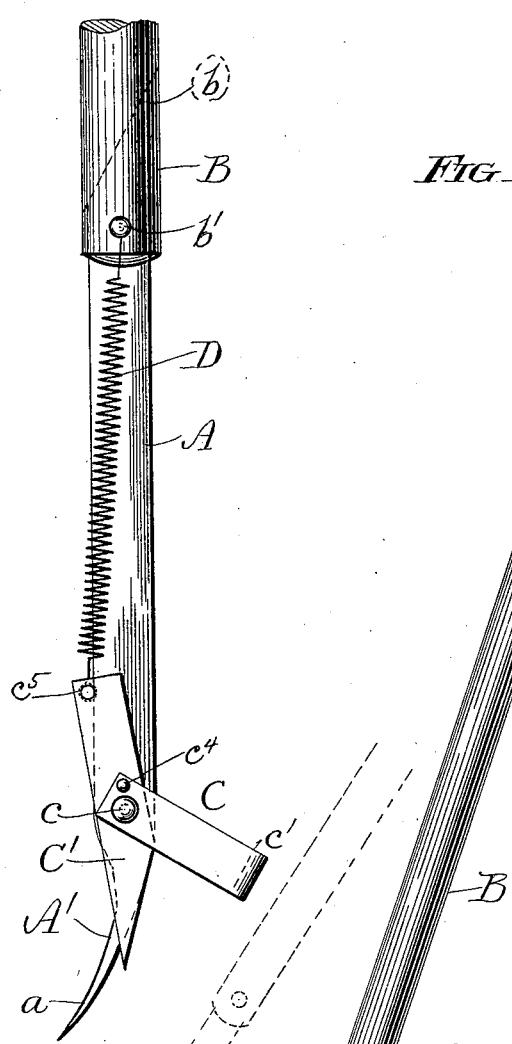
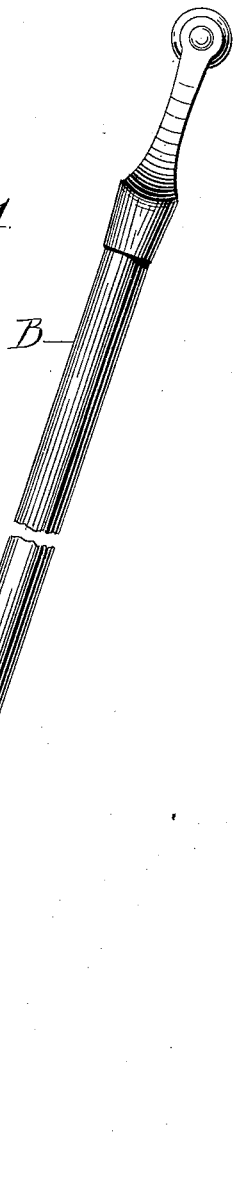
Witnesses:
J. Halpenny
M. E. Marsh
Inventor:
George Cutter
By Cutter & Graves
Att'ys.
THE NORRIS PETERS CO., PHOTO-LITHO., WASHINGTON, D. C.

UNITED STATES PATENT OFFICE.

GEORGE CUTTER, OF KENILWORTH, ILLINOIS.

WEEDING IMPLEMENT.

SPECIFICATION forming part of Letters Patent No. 637,091, dated November 14, 1899.

Application filed February 20, 1899. Serial No. 706,100. (No model.)

*To all whom it may concern:*

Be it known that I, GEORGE CUTTER, of Kenilworth, in the county of Cook and State of Illinois, have invented certain new and useful Improvements in Weeding Implements, of which the following is a specification.

This invention relates to garden-tools of that class which are more particularly designed for pulling dandelions and other weeds from lawns and grass-plats.

The object of the invention is to provide an improved device of this character; and it consists in the matters herein set forth, and more particularly pointed out in the appended claims.

In the accompanying drawings, Figure 1 is a general side elevation of a weed-puller constructed in accordance with my invention. Fig. 2 is an enlarged front view of the working parts thereof. Fig. 3 is a similar side view thereof.

The shank A of the weeder thus illustrated is shown as made of a flat piece of metal which is bent and swaged at its lower end to form a weed-pulling fork A', having a number of prongs $a$. At its upper end this shank is pivotally secured to a handle B, which is desirably made long enough to enable the user to manipulate the tool while standing. As herein shown, the handle B is slotted at its lower end at $b$ to receive the shank A, and the latter is pivotally secured within the slot by a pin $b'$, the end of the shank being arranged to contact with the end of the slot and form a stop to prevent its doubling backward beyond the line of the handle, while permitting it to fold up freely in a forward direction. Just back of the fork A' a fulcrum-frame C is secured in such position that when the fork A' is inserted beneath a weed or plant it will serve as a support over which the shank may be operated as a pry to pull the weed from the ground. In the improved construction shown this frame C is pivotally connected with the shank by a fulcrum-pin $c$ and is provided with rigidly-attached forwardly and downwardly projecting prongs C', which are arranged on each side of the fork A' and adapted to be forced into the ground or turf when the fork is inserted beneath the weed, a spring D being so applied that it normally swings the fulcrum-frame forward until the prongs C' lie along the side of and point in the same general direction as the fork A'. In this instance the lower rear portion of the fulcrum-frame behind the prongs C' is made in the form of a U-shaped strap $c'$, the lower transverse member of which is designed to bear upon the ground, while the fulcrum-pin $c$ is carried between its upwardly-projecting ends. Sleeves or washers $c^2$, provided on the fulcrum-pin $c$ at each side of the shank, hold the latter in its middle position on the pin, and dowel-pins $c^4$ serve to make rigid the connection between the loop $c'$ and prongs C'. The latter are shown as extending upwardly and rearwardly beyond the fulcrum-pin and as connected at their upper ends by a transverse pin $c^5$, and a spring D is in this instance applied between this transverse pin and the pivot-pin $b'$ of the handle B. Obviously, however, said spring may be applied in various other ways with the same general result.

In practical use the implement is designed to be grasped by the handle in the same manner as an ordinary spade, and when so held, with its lower end directed forwardly and downwardly, the shank A will naturally assume a position substantially in line with the handle B, as shown in dotted lines in Fig. 1. The forked lower end of the shank may then be thrust into the ground or turf close beside the weed which it is desired to pull and with the prongs of the fork embracing the root of the weed. By this action the fulcrum-frame will be brought into contact with the ground, with its U-shaped portion $c'$ resting freely upon the same and with the prong C' thrust into the turf or ground close to the root of the weed. The handle B is then thrust downward in such manner as to cause shank A to fulcrum on the pin $c$ and pry the weed and root bodily out of the ground, the handle and shank doubling up about their connecting-pivot $c'$ to permit this movement. The beginning of this action is shown in full lines in Fig. 1; but it may obviously continue in the same manner until the rear end of the shank comes in contact with the ground. The spring D will be elongated by this movement by reason of the fact that the fulcrum-frame will remain stationary as long as there is any considerable pressure upon it or until the root has given away or become loosened. Immediately, however, that the implement is lifted and prepared for repeating the operation, said spring will again contract and swing the fulcrum-frame forward until the prongs C' are again brought substantially into line with the fork A', ready to enter the ground again with said fork.

It will of course be understood that a practically-operative weeding implement of this character could be made by omitting the pivotally-attached handle B; but such an instrument would not possess the full advantages of the approved form hereinbefore described, since its use would require the operator to stoop or kneel, whereas one important feature of the present improvement consists in doing away with this necessity by the provision of said pivotally-attached handle. It will also be understood that various changes in the construction and arrangement of the parts of the implement may be made without departing from the true spirit of the invention or avoiding the ensuing claims.

I claim as my invention—

1. An implement comprising a shank provided at one end with a weeding-fork, a fulcrum projecting from the shank back of said fork, and a handle pivotally attached to the shank substantially as described.

2. An implement comprising a shank provided at one end with a weeding-fork; a fulcrum member pivotally connected with the shank back of the fork, and a handle pivotally connected to the shank at the end opposite the fork, substantially as described.

3. An implement comprising a shank provided with a weeding-fork at one end, a pronged fulcrum-frame pivoted to the shank back of the fork, and a spring applied to normally swing the prongs of the fulcrum-frame forwardly toward the fork, substantially as described.

4. An implement provided with a shank having a weeding-fork at one end, a fulcrum-frame pivoted to the shank back of the fork, a spring applied to normally swing the fulcrum-frame forwardly beneath the fork, and a handle pivotally connected to the shank, substantially as described.

5. The combination of the shank A having the fork end A', of the pivotally-attached fulcrum-frame C having the downwardly and forwardly projecting prongs C', the handle B pivoted to the upper end of the shank, and the spring D applied to throw the fulcrum-frame forwardly toward the fork.

6. The combination with the shank A having the forked end A', of the fulcrum-frame C comprising the U-shaped member $c'$, the fulcrum-pin $c$ extending through the upper ends of said U-shaped member and through the shank A, and the downwardly and forwardly projecting prongs C' united at their upper ends by the cross-bar $c^5$, the handle B pivoted to the shank, and the spring D applied between the cross-bar and handle-pivot.

In testimony that I claim the foregoing as my invention I affix my signature hereto, in the presence of two subscribing witnesses, this 28th day of November, A. D. 1898.

GEORGE CUTTER.

Witnesses:
HENRY W. CARTER,
M. E. MARSH.